UNITED STATES PATENT OFFICE.

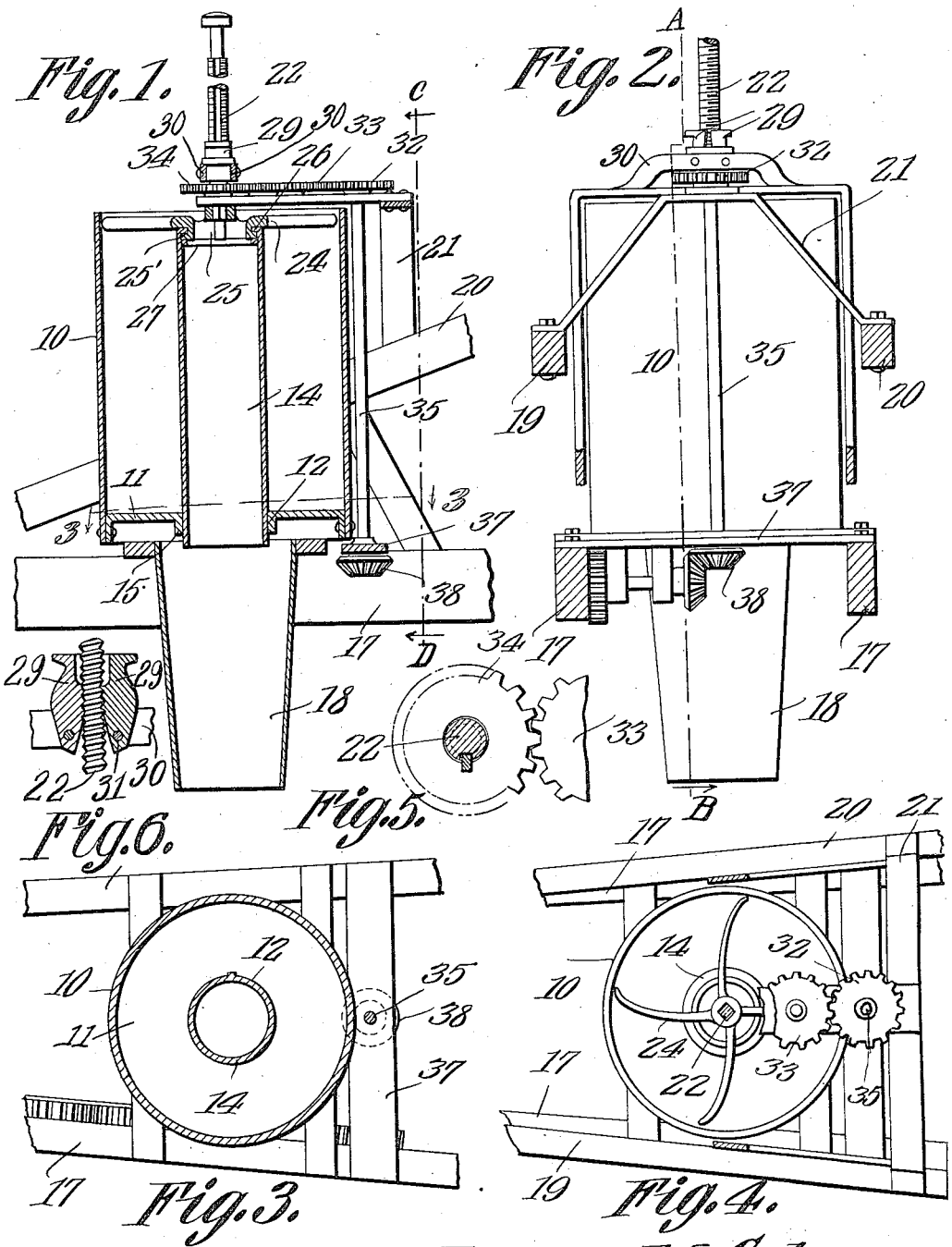

EUGENE MACON COLE, OF CHARLOTTE, NORTH CAROLINA.

FERTILIZER-DISTRIBUTER.

1,075,193.  Specification of Letters Patent.  Patented Oct. 7, 1913.

Original application filed June 14, 1911, Serial No. 633,093. Divided and this application filed May 17, 1912. Serial No. 697,990.

*To all whom it may concern:*

Be it known that I, EUGENE M. COLE, a citizen of the United States, residing at Charlotte, in the county of Mecklenburg and State of North Carolina, have invented a new and useful Fertilizer-Distributer, of which the following is a specification.

This invention relates to an improvement in fertilizer distributers, and the same is a division of my application filed June 14th 1911, Serial No. 633,093 for fertilizer distributers.

The primary object of the present invention is to provide a distributing device which, while intended to distribute guano or other fertilizer, will be equally adapted to distribute seed.

A further object of the invention is to provide a feeding mechanism which will accurately supply the fertilizer or seed in certain quantities the amount of which may be regulated.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings, forming a part of this specification:—Figure 1 is a longitudinal sectional view on the line A—B Fig. 2. Fig. 2 is a transverse section on the line C—D Fig. 1. Fig. 3 is a section taken on the line 3—3 of Fig. 1. Fig. 4 is a detail view of the distributing spider which is actuated to feed the material, and Fig. 5 is a view of the driving mechanism. Fig. 6 is a detail view showing the manner of supporting the feed screw, the screw engaging jaws being shown in section.

In the drawings, 10 designates a stationary hopper. The bottom 11 of this hopper is formed with a centrally disposed opening 12 which receives the end portion of the rotary cylindrical spout 14, a boss 15 formed integral with the bottom of the hopper effectually supporting the projecting end of the same.

Arranged immediately below the spout 14 and supported by beams 17 is the stationary spout 18 which conducts the material to the ground. The handle members 19 and 20 support a bracket 21 which extends over the hopper, its end being apertured to rotatably support a feed screw 22 on which is mounted the spider 24 which is formed with a head 25. This head extends in the spout 14 and is formed with an annular flange 25' which rests beneath the inturned end portions 26 of the spout 14. These portions 26 rotatably support said spout. The extended portion of the spider is free to rotate independent of the spout 14, and an annular ring 27 coacts with the flange 24 to form a bearing for the spider. The spider is mounted on a feed screw 22 which is screw threaded for the greater portion of its length and extends between jaw members 29 which are pivotally supported by the members 30, said jaw members being pivoted adjacent their lower ends as at 31 and interiorly threaded so that when the jaws are in their normal position they engage the threaded shaft or feed screw 22, advancing the same as it is rotated. It will be noted that as said screw rotates the spout 14 which is supported by the extension or head 25 of the spider will move vertically within the hopper, the spider supporting the spout in such manner that while the spout moves vertically the spider in addition to traveling from one end of the hopper to the other, also rotates, or the same may be supported so as to participate in the vertical movement alone.

The bracket 21 through which the feed screw extends, supports a plurality of gears 33 and 34, one of which is keyed on the screw 22, causing the same to rotate, the screw through its contact with said jaw member moving vertically and carrying the spider and spout with it. The gears are driven by a gear pinion 32 arranged on the end of the shaft 35. This shaft is supported at one end by the bracket 21 and at a point adjacent the other end by a transversely extending support 37. The bevel gear 38 is arranged on the shaft 35 and driven by any suitable means not shown. It will be noted that as the spout 14 and spider 24 rotate the spider will collect the material arranged in the hopper and gather it toward the center where it will deliver the same within the spout 14 through which it passes to the distributing spout 18.

When the hopper is full of material, the spout 14 and the spider 24 are in the position shown in Fig. 1, that is, at the limit of their upward movement. It will be noted that with the rotation of the spout 14, the spider will be fed toward the bottom of the hopper, thus distributing the entire contents of the same. The feed screw 22 is smooth adjacent its upper end and as the same is moved downward the jaws which engage the threads of the screw will eventually fall in contact with the said smooth portion, the further longitudinal feeding of the screw thus being stopped. Thus when the spout 14 and the spider 24 reach the bottom of the hopper the motion imparted to the screw 22 while continuing to cause a rotation of the same will not impart vertical movement to the spout 14. It will be noted by the peculiar construction of the jaws that the spout 14 and the spider may be lifted to the position shown in Fig. 1 and the hopper again filled with the material which is being distributed.

Attention is also called to the fact that the structure is such as may be easily and economically manufactured and the various parts readily assembled.

I claim—

1. In a fertilizer distributer, a stationary hopper, a spout mounted for vertical movement within said hopper, a rotary distributing member said distributing member being formed with a collar arranged to extend within said spout, a feed screw secured to said distributing member and means for imparting movement to said feed screw, the movement thus imparted causing the rotary movement of the distributer and the vertical movement of said spout.

2. In a fertilizer distributer, a stationary hopper, a spout mounted for vertical movement within said hopper, a stationary spout arranged below the first mentioned spout and in register with the same, a feed screw, a rotary distributer mounted on said feed screw said distributer receiving a plurality of curved radially extending arms, a boss formed integral with said distributer, said boss extending within said vertically movable spout, said spout being movable vertically, a gear keyed on said screw, a plurality of pivotally supported screw threaded jaw members capable of imparting a vertical movement to said screw.

3. In a fertilizer distributer, a stationary hopper, a spout for vertical movement within said hopper, a stationary spout arranged below the first mentioned spout and in register with the same, a feed screw, a rotary distributer mounted on said feed screw, said distributer receiving a plurality of curved radially extending arms, a boss formed integral with said distributer, said boss extending within said vertically movable spout, a gear keyed on said screw, and a plurality of pivotally supported screw threaded jaw members capable of imparting vertical movement to said screw, said screw being smooth adjacent one of its ends.

4. In a fertilizer distributer, a stationary hopper, a cylindrical member mounted for vertical movement within said hopper and means movable with said spout for depositing the material arranged within said hopper in said spout.

5. In a fertilizer distributer, a stationary hopper, a vertically movable cylindrical member arranged within said hopper, a rotatably supported vertically movable distributing member movable with said spout, said member being formed with a plurality of radially extending arms arranged to distribute the material arranged in said hopper in said spout.

In testimony that I claim the foregoing as my own, I have hereto affixed my signature in the presence of two witnesses.

EUGENE MACON COLE.

Witnesses:
J. A. WILLIAMS,
H. F. WOLFE.